US012763350B2

(12) United States Patent
Yoshinaga et al.

(10) Patent No.: US 12,763,350 B2
(45) Date of Patent: Oct. 13, 2026

(54) ELECTRODE, MEMBRANE ELECTRODE ASSEMBLY, ELECTROCHEMICAL CELL, STACK, AND ELECTROLYZER

(71) Applicants: KABUSHIKI KAISHA TOSHIBA, Tokyo (JP); TOSHIBA ENERGY SYSTEMS & SOLUTIONS CORPORATION, Kawasaki Kanagawa (JP)

(72) Inventors: Norihiro Yoshinaga, Yokohama Kanagawa (JP); Hyangmi Jung, Yokohama Kanagawa (JP); Taishi Fukazawa, Chofu Tokyo (JP); Yoshihiko Nakano, Yokohama Kanagawa (JP); Hiroaki Hirazawa, Kawasaki Kanagawa (JP); Yoshitsune Sugano, Kawasaki Kanagawa (JP); Yuki Kudo, Yokohama Kanagawa (JP); Akihiko Ono, Kita Tokyo (JP)

(73) Assignee: KABUSHIKI KAISHA TOSHIBA, Kawasaki Kanagawa (JP)

( * ) Notice: Subject to any disclaimer, the term of this patent is extended or adjusted under 35 U.S.C. 154(b) by 589 days.

(21) Appl. No.: 18/461,693

(22) Filed: Sep. 6, 2023

(65) Prior Publication Data

US 2024/0120499 A1 Apr. 11, 2024

(30) Foreign Application Priority Data

Oct. 7, 2022 (JP) ................................ 2022-162625

(51) Int. Cl.
*H01M 8/00* (2016.01)
*H01M 8/1004* (2016.01)

(52) U.S. Cl.
CPC ................................ *H01M 8/1004* (2013.01)

(58) Field of Classification Search
CPC .................................................. H01M 8/1004
USPC ......................................................... 502/182
See application file for complete search history.

(56) References Cited

U.S. PATENT DOCUMENTS

| | | | |
|---|---|---|---|
| 8,758,959 B2 | 6/2014 | Mei et al. | |
| 10,777,821 B2 | 9/2020 | Mei et al. | |
| 11,223,051 B2 | 1/2022 | Kanai et al. | |
| 2008/0230171 A1 | 9/2008 | Mei et al. | |
| 2017/0130348 A1 | 5/2017 | Mei et al. | |
| 2017/0183788 A1* | 6/2017 | Iida | C23C 14/0036 |
| 2019/0071784 A1 | 3/2019 | Yoshinaga et al. | |
| 2019/0296362 A1 | 9/2019 | Mei et al. | |

(Continued)

FOREIGN PATENT DOCUMENTS

| | | |
|---|---|---|
| EP | 3 453 785 A1 | 3/2019 |
| JP | 2017-89007 A | 5/2017 |

(Continued)

*Primary Examiner* — James E Mcdonough

(74) *Attorney, Agent, or Firm* — Finnegan, Henderson, Farabow, Garrett & Dunner, LLP

(57) ABSTRACT

An electrode according to an embodiment includes a support, and a catalyst layer including a sheet layer and a gap layer stacked, alternately on the support. The catalyst layer includes noble oxide and non-noble oxide. 4 [wt %] or more and 8 [wt %] or less of metal elements included in the catalyst layer is non-noble metal. An average thickness of the gap layer is 6 [nm] or more and 50 [nm] or less.

12 Claims, 6 Drawing Sheets

(56) References Cited

U.S. PATENT DOCUMENTS

| | | | | |
|---|---|---|---|---|
| 2019/0296380 | A1* | 9/2019 | Iida | C23C 14/185 |
| 2021/0083300 | A1 | 3/2021 | Kanai et al. | |

FOREIGN PATENT DOCUMENTS

| | | | |
|---|---|---|---|
| JP | 2019-166516 | A | 10/2019 |
| JP | 2019-167620 | A | 10/2019 |
| JP | 2021-45709 | A | 3/2021 |

* cited by examiner

ELECTRODE, MEMBRANE ELECTRODE ASSEMBLY, ELECTROCHEMICAL CELL, STACK, AND ELECTROLYZER

CROSS-REFERENCE TO RELATED APPLICATION

This application is based upon and claims the benefit of priority from Japanese Patent Application No. 2022-162625, the Filing Date of which is Oct. 7, 2022, the entire contents of which are incorporated herein by reference.

FIELD

The present embodiments relate to an electrode, a membrane electrode assembly, an electrochemical cell, a stack, and an electrolyzer.

BACKGROUND

In recent years, electrochemical cells have been actively studied. Among electrochemical cells, for example, a polymer electrolyte membrane electrolysis cell (PEMEC) is expected to be used for hydrogen generation in a large-scale energy storage system. In order to ensure sufficient durability and electrolytic properties, platinum (Pt) nanoparticle catalysts are generally used for PEMEC cathodes, and noble metal catalysts such as iridium (Ir) nanoparticle catalysts are used for positive electrodes. Additionally, a method for obtaining hydrogen from ammonia is also considered. Other applications include anodes for an electrolyzer that decompose carbon dioxide electrolytically to produce methanol, ethylene, and other organics, or carbon monoxide.

DETAILED DESCRIPTION

Figure 1:
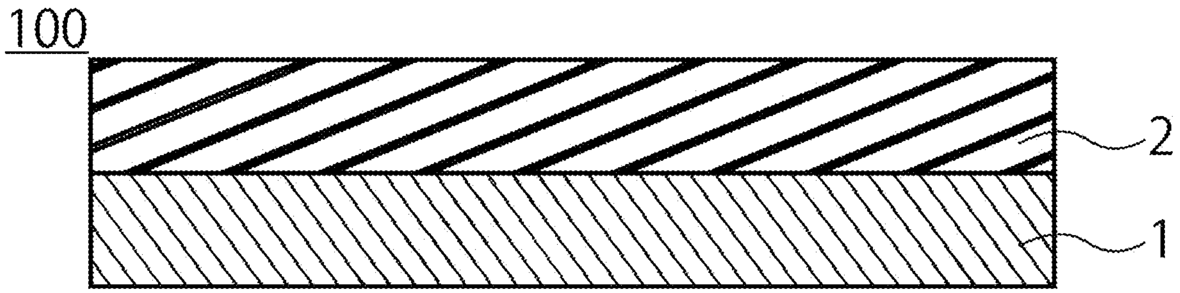
FIG. 1 is a schematic diagram of an electrode according to an embodiment.

An electrode according to an embodiment includes a support, and a catalyst layer including a sheet layer and a gap layer stacked, alternately on the support. The catalyst layer includes noble oxide and non-noble oxide. 4 [wt %] or more and 8 [wt %] or less of metal elements included in the catalyst layer is non-noble metal. An average thickness of the gap layer is 6 [nm] or more and 50 [nm] or less.

Hereinafter, the embodiments will be described with reference to the drawings.

It is to be noted that the same reference numerals are given to common components throughout the embodiments, and redundant explanations are omitted.

In the specification, values at 25[° C.] and 1 atm (atmosphere) are shown. Each thickness of the members represents an average of distance in a stacking direction.

First Embodiment

The first embodiment relates to an electrode. FIG. 1 shows a schematic cross-sectional diagram of an electrode 100 of the embodiment. The electrode 100 has a support 1 and a catalyst layer 2. The catalyst layer 2 is used in the embodiment as a catalyst in the electrode reaction of water electrolysis. The catalyst layer 2 is also used as an anode catalyst in the electrolytic generation of ammonia.

The electrode 100 of the first embodiment is used as an anode in water electrolysis. When the catalyst layer 2 further contains a catalyst for fuel cells, the electrode 100 of the embodiment is also used as the oxygen electrode of a fuel cell. The electrode 100 of the embodiment can also be used as an anode for electrolytic generation of ammonia. The electrode 100 of the embodiment can be used as an anode of an electrolyzer for ammonia synthesis. In addition to water electrolysis, for example, ultrapure water is supplied to the anode, water is decomposed to generate protons and oxygen at the anode, the generated protons pass through the electrolyte membrane, and nitrogen, protons, and electrons supplied to the cathode are bonded to produce ammonia. The electrode 100 of the embodiment can be used for the anode of a membrane electrode assembly used in electrolysis for ammonia synthesis. The electrode 100 of the embodiment can also be used as a cathode for generating hydrogen by electrolyzing ammonia. The electrode 100 according to embodiments can be used as a cathode for a hydrogen generation apparatus. Hereinafter, an example of water electrolysis is described in the first embodiment and the other embodiments. The electrode 100 according to embodiments can be also used for other than water electrolysis, for example, as a cathode of a membrane electrode assembly for electrolysis of decomposing ammonia so that ammonia is supplied to a cathode, proton and nitrogen is generated in the cathode by decomposing ammonia, the generated proton passes through an electrolyte membrane, and hydrogen is synthesized by binging protons and electrons.

It is preferable that a porous and highly conductive material be used as the support 1. The support 1 is a porous material through which gases and liquids pass. Since the electrode 100 is also used as an anode in a water electrolysis cell, for example, a porous support of valve metal is preferred. It is preferable that the porous support of the valve metal is a porous support including one or more metals selected from the group consisting of titanium, aluminum, tantalum, niobium, hafnium, zirconium, zinc, tungsten, bismuth, and antimony, or a porous support including one metal selected from the group consisting of titanium, aluminum, tantalum, niobium, hafnium, zirconium, zinc, tungsten, bismuth, and antimony.

Ti is preferred as a durable valve metal for the support 1. For example, Ti mesh, a cloth made of Ti fibers, or a Ti sintered body is used as the support 1. The porosity of the support 1 is preferably 20[%] or more and 95[%] or less, and more preferably 40[%] or more and 90[%] or less, considering the movement of materials. For example, when the support 1 is a metallic nonwoven fabric made of intertwined metallic fibers, the fiber diameter is preferably 1 [μm] or more and 500 [μm] or less, and more preferably 1 [μm] or more and 100 [μm] or less, considering the reactivity and the power-feeding property. When the support 1 is a particle sintered body, the particle diameter is 1 [μm] or more and 500 [μm] or less, and more preferably 1 [μm] or more and 100 [μm] or less in consideration of reactivity and power-feeding property.

A coating layer can be added on the support 1. The dense coating layer having conductivity improves the durability of the electrode 100. The coating layer is not limited, but can be made of metallic materials, ceramic materials such as oxides and nitrides, and carbon. With respect to the coating layer, a multilayer or gradient structure composed of different materials can be formed to further enhance durability.

The catalyst layer 2 includes noble metal oxides and non-noble metal oxides with Ir and Ru as main components. An intermediate layer, not shown, may be provided between the catalyst layer 2 and the support 1.

The amount of noble metal in catalyst layer 2 is preferably 0.02 [$mg/cm^2$] or more and 1.0 [$mg/cm^2$] or less, and more preferably 0.05 [$mg/cm^2$] or more and 0.5 [$mg/cm^2$] or less. The sum of these masses can be measured by ICP-MS.

The porosity of the catalyst layer 2 is preferably 10[%] or more and 90[%] or less, and more preferably 30[%] or more and 70[%] or less.

Figure 2:
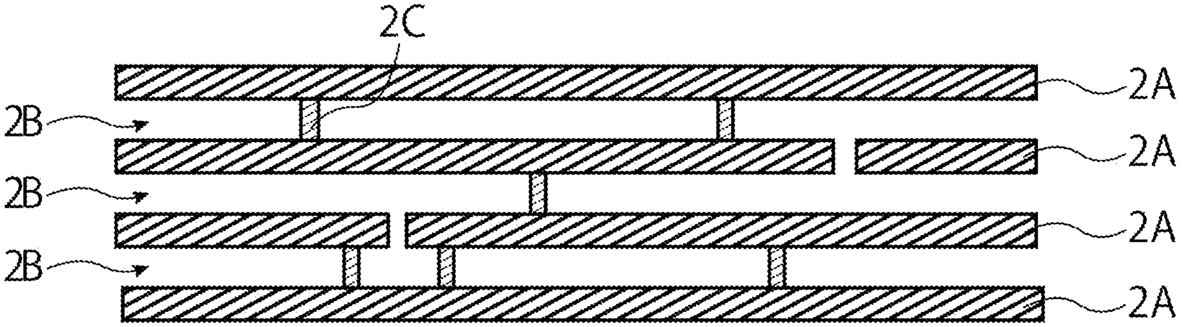
FIG. 2 is a cross-sectional schematic diagram of a catalyst layer according to an embodiment.

The catalyst layer 2 has a structure of alternately stacked the sheet layer 2A and the gap layer 2B. The stacking structure of the catalyst layer 2 is shown in the schematic cross-sectional diagram of the catalyst layer 2 in FIG. 2. The sheet layer 2A and gap layer 2B are stacked in parallel. The gap layer 2B is mostly hollow, but some of the sheet layer 2A protrudes and the sheet layers 2A are connected. The sheet layers 2A are connected by columnar member 2C present in the gap layer 2B, and the laminated structure is maintained.

The sheet layer 2A is a sheet-like layer of agglomerated catalyst particles. There are some voids in the sheet layer 2A. The gap layer 2B is the area between the sheet layer 2A. Unlike the sheet layer 2A, the gap layer 2B does not have a regular structure of catalyst particles.

The average thickness of one layer of the sheet layer 2A is preferably 6 [nm] or more and 50 [nm] or less. The average thickness of one layer of the gap layer 2B is preferably 6 [nm] or more and 50 [nm] or less. The average thickness of one layer of the sheet layer 2A is preferably thicker than the average thickness of one layer of the gap layer 2B. Some gap layers 2B may be thicker than some sheet layers 2A.

The catalyst layer 2 preferably includes an oxide including Ir and/or Ru. The catalyst layer 2 preferably includes Ir oxide or/and Ir and Ru composite oxide as the noble metal oxide, and optionally includes Ru oxide as the noble metal oxide. The sum of the concentrations of Ir and Ru among the noble metals in catalyst layer 2 is preferably 90 [wt %] or more and 100 [wt %] or less.

The catalyst layer 2 preferably includes an oxide including one or more non-noble metal elements selected from the group consisting of Ni, Co, and Mn as non-noble metal oxides. The non-noble metals included in catalyst layer 2 preferably include Ni and, optionally, Co or/and Mn. When the amount of non-noble metal elements included in catalyst layer 2 is 100 [wt %], the total ratio of Ni, Co and Mn among the non-noble metals included in catalyst layer 2 is preferably 80 [wt %] or more and 100 [wt %] or less.

When the amount of all metal elements in the catalyst layer 2 is 100 [wt %], 4 [wt %] or more and 8 [wt %] or less of the metal elements in the catalyst layer 2 is preferably non-noble metals (the mass ratio of non-noble metal elements in the metal elements in the catalyst layer 2 is 4 [wt %] or more and 8 [wt %] or less). When the amount of all metal elements in the catalyst layer 2 is 100 [wt %], it is preferable that 4 [wt %] or more and 8 [wt %] or less of the metal elements in the catalyst layer 2 is non-noble metal (the mass ratio of non-noble metal elements in the metal elements in the catalyst layer 2 is 4 [wt %] or more and 8 [wt %] or less). The total concentration of one or more non-noble metals selected from the group consisting of Ni, Co, and Mn in the metal elements included in the catalyst layer 2 is preferably 4 [wt %] or more and 8 [wt %] or less. When the amount of all metal elements in the catalyst layer 2 is 100 [wt %], the ratio of Ni to the non-noble metal elements in the catalyst layer 2 is preferably 50 [wt %] or more and 100 [wt %] or less, more preferably 75 [wt %] or more and 100 [wt %] or less. Non-noble metal elements are also present in the catalyst layer 2 as oxides, acting as a co-catalyst for the noble metal oxides and structurally supporting the catalyst layer 2.

When 4 [wt %] or more 8 [wt %] or less of the metal elements in the catalyst layer 2 with the stacked structure of the embodiment are non-noble metals, the initial electrolytic voltage is high, but the voltage rise is preferably small when the MEA is allowed to run for a long time. Longer operation of MEAs is becoming possible, and the importance of small voltage rise is increasing in consideration of long operation time. When 10 [wt %] or more of the metal elements in the catalyst layer 2 with the stacked structure of the embodiment is non-noble metal, the initial electrolytic voltage is kept low due to their catalyst effect. However, the electrolytic voltage tends to increase comparatively due to changes in the stacked structure of the catalyst layer 2 as a result of elution of non-noble metal oxides during electrolytic operation. If less than 4% of the metal elements in the catalyst layer 2 having the stacked structure of the embodiment is non-noble metal, it is difficult to maintain the stacked structure of the catalyst layer 2, and the gap layer 2B becomes narrower because a lot of sheet layers 2A may touch each other. When the gap layer 2B narrows, it becomes difficult for water and other substances to move within the catalyst layer 2. If less than 4 [wt %] of the metal elements in the catalyst layer 2 having the stacked structure of the embodiment is non-noble metal, the co-catalyst effect is small and the cell voltage of water electrolysis is high from the initial stage.

When the average thickness of the gap layer 2B is 5 [nm] or less, the gap layer 2B is easily collapsed and the initial voltage is easily increased, although the structure of the sheet layer 2A can be maintained when the ratio of non-noble metal is 4 [wt %] or more and 8 [wt %] or less. When the average thickness of the gap layer 2B is 5 [nm] or less, the initial voltage is high when the non-noble metal ratio is 4 [wt %] or more and 8 [wt %] or less, but the voltage increase is small even after long-term operation. When the average thickness of the gap layer 2B is 6 [nm] or more and 50 [nm] or less, the structure of the sheet layer 2A and the gap layer 2B is maintained after a long period of operation when the non-noble metal ratio is 4 [wt %] or more and 8 [wt %] or less, and the water electrolysis voltage is maintained low because the structure of the gap layer 2B is not easily collapsed from the beginning. When the non-noble metal ratio is low and the average thickness of the gap layer 2B is thin, there are many areas where the gap layer 2B is collapsed due to thin or few columnar bodies 2C, i.e., when the cross section of the catalyst layer 2 is observed at the analyzed spots A1 to A9 in FIG. 3, the areas where the gap layer 2B is less than 2 [nm] thick are occupies 20[%] or more in the width and depth directions.

Figure 3:
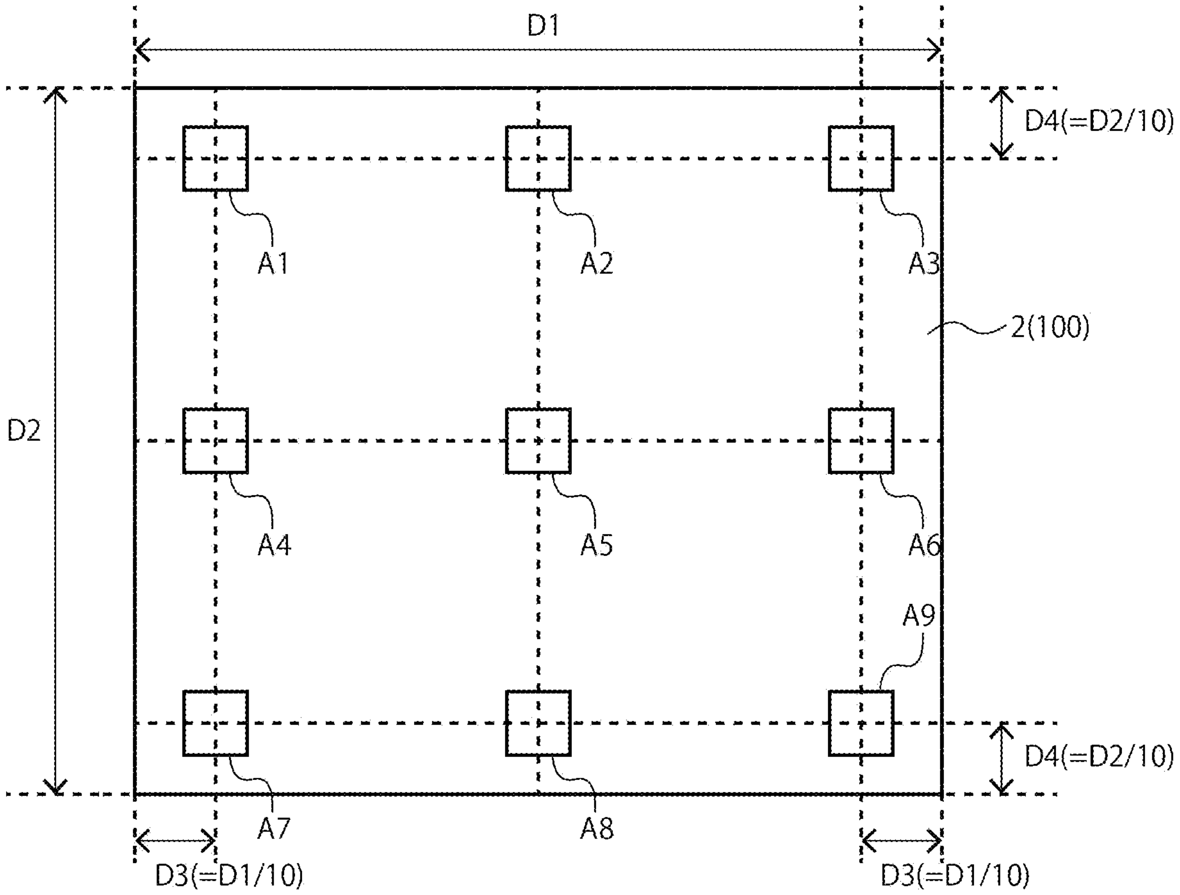
FIG. 3 shows analysis spots according to an embodiment.

Each spot is square-shaped and has an area of at least 1 $mm^2$. As shown in FIG. 3, when the length of the electrode 100 is D1 and the width of the electrode 100 is D2 (D1≥D2), a virtual line is drawn at a distance of D3 (=D1/10) inward from each of the two opposing sides of the electrode 100 in the width direction, a virtual line is drawn at a distance of D4 (=D2/10) from the two opposing sides in the length direction of the electrode 100, and then draw a virtual line parallel to the width direction through the center of the electrode 100 and a virtual line parallel to the length direction through the center of the electrode 100. The area centered at the nine intersection points of the virtual lines is designated as analysis spots A1 to A9. The cross-section observed by SEM is perpendicular to the plane of FIG. 3 and parallel to the width direction. The thickness of each gap layer 2B in the analyzed spots A1 to A9 is obtained at intervals of 50 [nm] in the width direction of the SEM image. Then, determine the ratio of the gap layer 2B having a thickness of less than 2 [nm]. The average thicknesses of the gap layer 2B and sheet layer 2A are obtained in the same manner.

When the ratio of non-noble metals is, for example, 10 [wt %] or more, the catalyst structure is well maintained initially both when the thickness of the gap layer 2B is 5 [nm] or less and when it is 6 [nm] or more. However, after long-term operation, it becomes difficult to maintain the catalytic structure due to the elution of more non-noble metals, and the cell voltage of water electrolysis tends to increase.

The inventors' research revealed that a high ratio of non-noble metals is preferable regardless of the thickness of the gap layer 2B when considering the co-catalyst effect, and a low ratio of non-noble metals is preferable when considering the maintenance of the catalyst structure. Considering the effect of the catalyst itself and the effect of maintaining the catalyst structure itself, an intermediate non-noble metal ratio is expected to be preferable regardless of the thickness of the gap layer 2B, but as explained above, the thickness of the gap layer 2B is also relevant to obtain the two effects. From the viewpoint of obtaining both the effect of the co-catalyst and the maintenance of the catalyst structure, the thickness of the gap layer 2B is preferably 6 [nm] or more and 50 [nm] or less, and more preferably 6 [nm] or more and 10 [nm] or less when the non-noble metal ratio is 4 [wt %] or more and 8 [wt %] or less.

From the above viewpoint, it is preferable that 4 [wt %] or more and 7 [wt %] or less of the metal elements in the catalyst layer 2 is non-noble metal and that the thickness of the gap layer 2B is 6 [nm] or more and 50 [nm] or less. The total concentration of one or more non-noble metals selected from the group consisting of Ni, Co, and Mn included in the catalyst layer 2 to the metal elements included in the catalyst layer 2 is preferably 4 [wt %] or more and 6 [wt %] or less, and the thickness of the gap layer 2B is 6 [nm] or more and 50 [nm] or less. The ratio of Ni to the non-noble metal elements in the catalyst layer 2 is preferably 50% or more and 100% or less, and more preferably 75% or more and 100% or less.

From the above viewpoint, it is preferable that 4 [wt %] or more and 7 [wt %] or less of the metal elements in the catalyst layer 2 is non-noble metal and that the thickness of the gap layer 2B is 6 [nm] or more and 30 [nm] or less. The total concentration of one or more non-noble metals selected from the group consisting of Ni, Co, and Mn in the metal elements included in the catalyst layer 2 is preferably 4 [wt %] or more and 6 [wt %] or less. When the total amount of non-noble metals contained in the catalyst layer 2 is 100 [wt %], the ratio of Ni to the non-noble metal elements is preferably 50 [wt %] or more and 100 [wt %] or less, and more preferably 75 [wt %] or more and 100 [wt %] or less.

The catalyst layer 2 is preferably formed on the support 1 by sputtering alternately a sheet layer precursor that is substantially a precursor of the sheet layer 2A and contains noble metal oxides and a gap layer precursor that is substantially a precursor of the gap layer 2B and mainly composed of non-noble metal oxides and dissolving the non-noble metal oxides by acid treatment. When noble metals are also sputtered simultaneously during the formation of the gap layer precursors, [target output]×[output time] of noble metals is preferably 5% or more and 30% or less of [target output power]×[output time] of non-noble metals. If the gap layer precursor contains a large amount of noble metal oxides, Ni in the gap layer tends to remain dissolved during acid treatment, and the Ni ratio in the gap layer tends to increase. Since much of the Ni remaining in the gap layer is eluted at the potential when electrochemically generating oxygen, the remained non-noble metal oxide may be deposited on the electrolyte membrane and performance deteriorates after long-term operation. On the other hand, too little iridium in the gap layer causes the structure to collapse and the thickness of the gap layer to become thin, resulting in a high initial voltage due to the lack of smooth mass transport in the gap layer.

The concentration of each metal element in the catalyst layer 2 can be determined by ICP-MS (inductively coupled plasma mass spectrometry). The concentration of each metal element in the catalyst layer 2 is determined from after the electrode 100 is manufactured until after the MEA or electrochemical cell is manufactured using the manufactured electrode and before voltage is applied externally.

The amount of non-noble metals (non-noble metal oxides) in the catalyst layer 2 can be adjusted by adjusting the time of acid treatment and other conditions.

Second Embodiment

Figure 4:
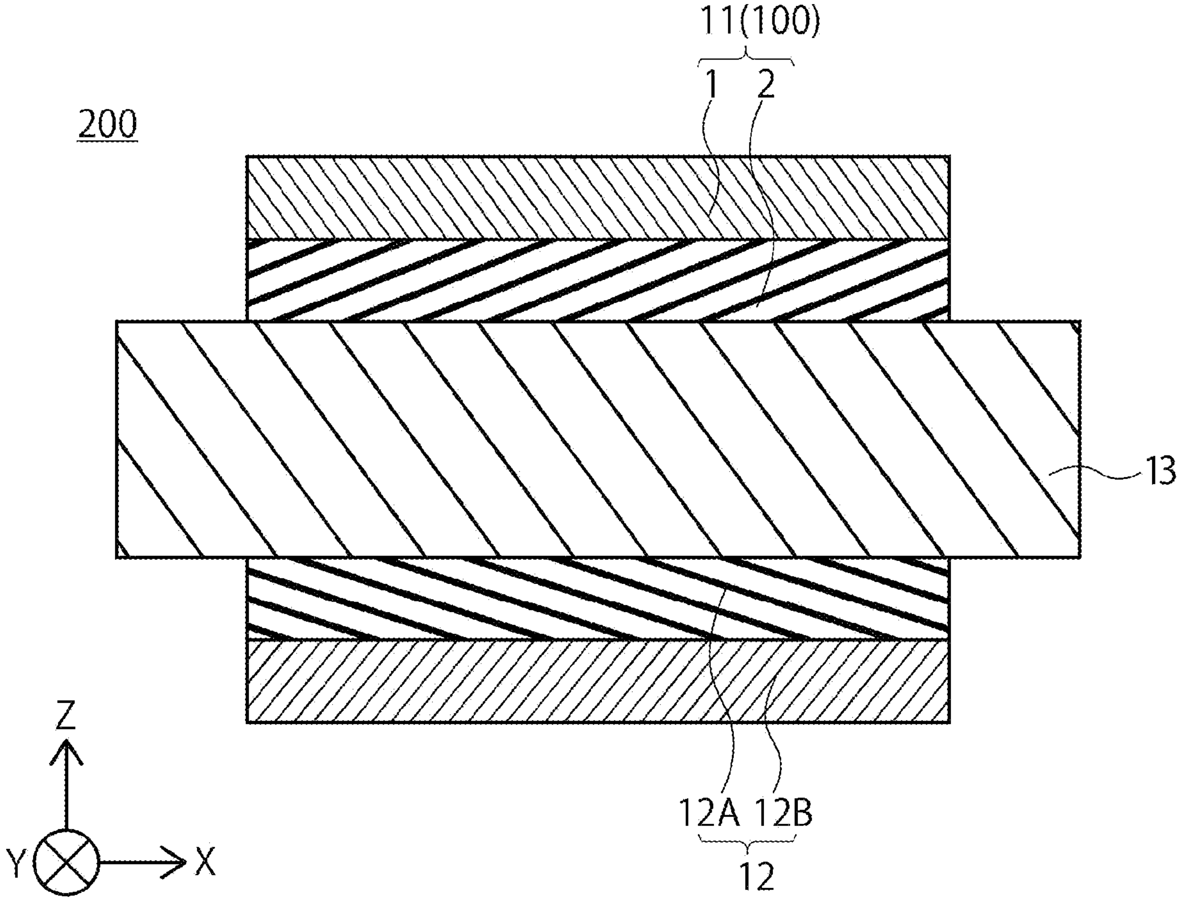
FIG. 4 is a schematic diagram of a membrane electrode assembly according to an embodiment.

A second embodiment relates to a membrane electrode assembly (MEA). FIG. 4 shows a schematic diagram of an embodiment of a membrane electrode assembly 200. The membrane electrode assembly 200 has a first electrode 11, a second electrode 12, and an electrolyte membrane 13. The first electrode 11 is preferably an anode electrode and the second electrode 12 is preferably a cathode electrode. It is preferred to use the electrode 100 of the first embodiment for the first electrode 11. The membrane electrode assembly 200 of the embodiment is preferably used in an electrochemical cell or stack for hydrogen generation or oxygen generation.

It is preferable that electrode 100 of the first embodiment be used as the first electrode 11. The catalyst layer 2 of the electrode 100 used as the first electrode 11 is provided on the electrolyte membrane 13 side. It is preferable that the catalyst layer 2 is in direct contact with the electrolyte membrane 13.

The second electrode 12 has a second support 12A and a second catalyst layer 12B. The second catalyst layer 12B is provided on the second support 12A. The second catalyst layer 12B is provided on the electrolyte membrane 13 side. It is preferable that the second catalyst layer 12B is in direct contact with the electrolyte membrane 13.

It is preferable that a porous and highly conductive material is used as the second support 12A. The second support 12A is a porous material through which gases and liquids pass. The second support 12A is, for example, carbon paper or a metal mesh. As a metal mesh, a porous support of valve metal is preferable. It is preferable that the porous support of valve metal is a porous support material including one or more metals selected from the group consisting of titanium, aluminum, tantalum, niobium, hafnium, zirconium, zinc, tungsten, bismuth, and antimony, and a porous support material including one or more metals selected from the group consisting of titanium, aluminum, tantalum, niobium, hafnium, zirconium, zinc, tungsten, bismuth and antimony. The second support 12A has a carbon layer (MPL layer) containing carbon particles and a water repellent resin (fluororesin such as PTFE or Nafion). The carbon layer is provided, for example, between the carbon paper and the second catalyst layer 12B.

The second catalyst layer 12B has a catalyst metal. It is preferable that the second catalyst layer 12B is particles of catalyst metal and that the catalyst metal is not supported on a carrier. The second catalyst layer 12B is preferably a porous catalyst layer. The catalyst metal is not limited, but includes, for example, one or more metal elements selected from the group consisting of Pt, Rh, Os, Ir, Pd, and Au. It is preferable that one or more metal elements selected from the group consisting of such catalytic materials be included. The catalyst metal is preferably metal, alloy, or metal oxide. The second catalyst layer 12B, for example, preferably has a plurality of catalyst units consisting of alternately stacked catalyst layers in sheet form and gap layers.

The amount of metal per area of the second catalyst layer 12B is preferably 0.02 [mg/cm$^2$] or more and 1.0 [mg/cm$^2$] or less, and more preferably 0.05 [mg/cm$^2$] or more and 0.5 [mg/cm$^2$] or less. The sum of these masses can be measured by ICP-MS.

The porosity of the second catalyst layer 12B is preferably 10[%] or more and 90[%] or less, and more preferably 30[%] or more and 70[%] or less.

The electrolyte membrane 13 is a proton-conducting membrane. Fluorinated polymers or aromatic hydrocarbon polymers having one or more selected from the group consisting of sulfonic acid groups, sulfonimide groups, and sulfate groups are preferred as the electrolyte membrane 13. The fluorinated polymers having sulfonic acid groups are preferred as electrolyte membranes 13. For example, Nafion (trademark DuPont), Flemion (trademark Asahi Kasei), Selemion (trademark Asahi Kasei), Aquivion (trademark Solvay Specialty Polymers) or Aciplex (trademark Asahi Glass), etc. can be used as fluorinated polymers having sulfonic acid groups.

The thickness of the electrolyte membrane 13 can be determined appropriately in consideration of the membrane's permeability, durability, and other characteristics. From the viewpoint of strength, dissolution resistance, and output power characteristics of the MEA, the thickness of the electrolyte membrane 13 is preferably 20 [μm] or more and 500 [μm] or less, more preferably 50 [μm] or more and 300 [μm] or less, and even more preferably 80 [μm] or more and 200 [μm] or less.

The electrolyte membrane 13 preferably includes a noble metal region on the first electrode 11 side. The noble metal region includes noble metal particles. The noble metal region is preferably located on the surface of the electrolyte membrane 13. The noble metal region preferably consists of a single region, but may also consist of multiple separated regions.

The noble metal particles are preferably particles of one or more noble metals selected from the group consisting of Pt, Re, Rh, Ir, Pd, and Ru. The noble metal particles may include particles of an alloy containing one or more selected from the group consisting of Pt, Re, Rh, Ir, Pd and Ru. The noble metal particles are preferably particles of one noble metal selected from the group consisting of Pt, Re, Rh, Ir, Pd, and Ru. Pt particles are preferred for the noble metal particles. Re particles are preferred for the noble metal particles. Rh particles are preferred for the noble metal particles. Ir particles are preferred for noble metal particles. Pd particles are preferred for noble metal particles. Ru particles are preferred for noble metal particles.

The noble metal particles oxidize hydrogen that is generated on the cathode side and passes through the electrolyte membrane 13. The noble metal particles can reduce hydrogen leakage. Because the noble metal particles are present on the anode side, they are less likely to oxidize the hydrogen that is discharged from the cathode side. The area where noble metal particles are present may also be present in the electrolyte membrane 13 on the second electrode 12 (cathode) side.

The average circumscribed circle diameter of the noble metal particles is preferably 0.5 [nm] or more and 50 [nm] or less, more preferably 1 [nm] or more and 10 [nm] or less, and even more preferably 1 [nm] or more and 5 [nm] or less.

By virtue of using the highly durable electrode 100 as the anode of the membrane electrode assembly 200, the membrane electrode assembly can be operated for a long time with high activity.

Third Embodiment

Figure 5:
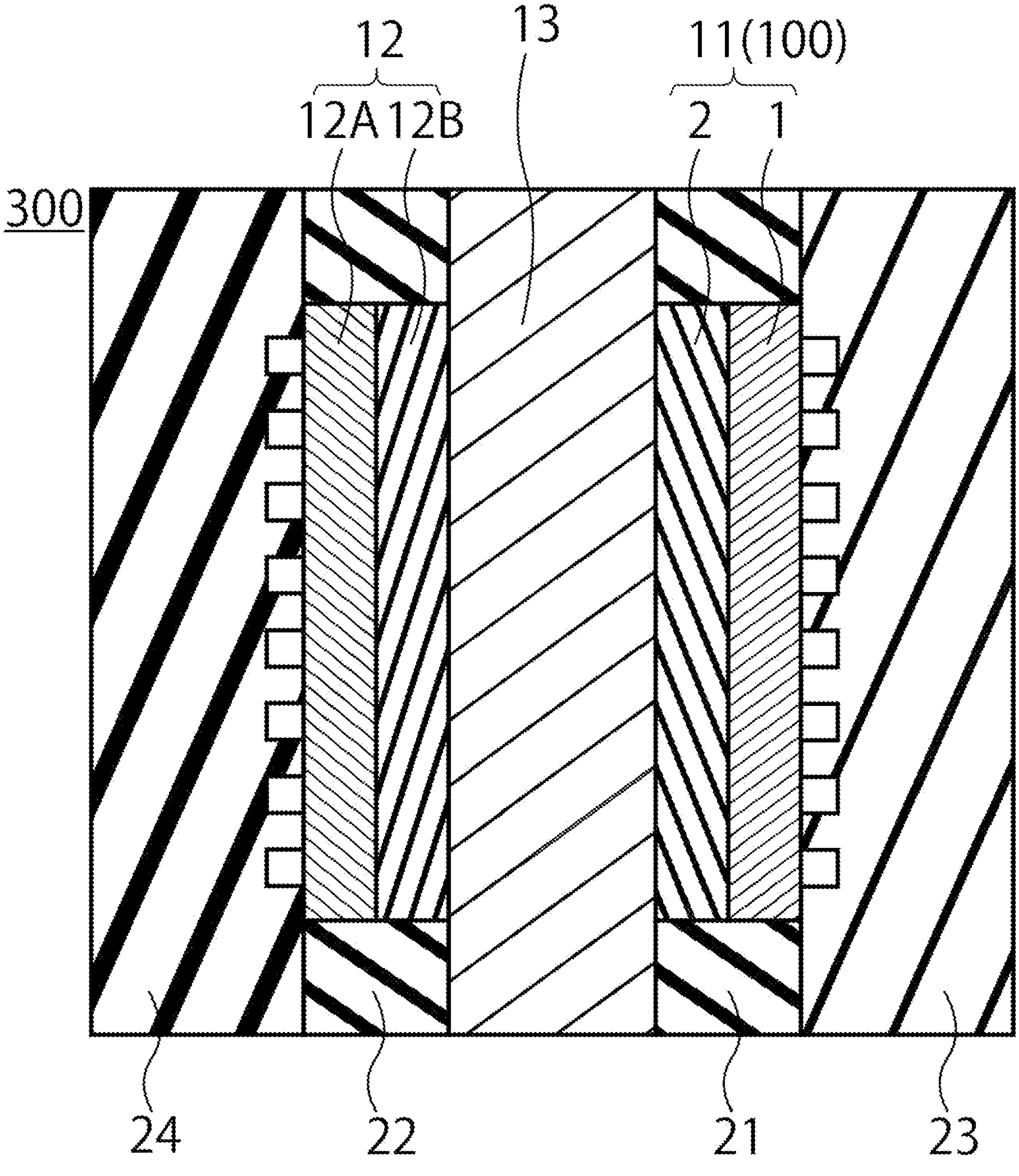
FIG. 5 is a schematic diagram of an electrochemical cell according to an embodiment.

A third embodiment relates to an electrochemical cell. FIG. 5 shows a cross-sectional diagram of the electrochemical cell 300 of the second embodiment. The electrochemical cell 300 is described below using water electrolysis as an example, but hydrogen can also be generated by decomposing ammonia and other substances in addition to water.

As shown in FIG. 5, the electrochemical cell 300 of the third embodiment has a first electrode (anode) 11, a second electrode (cathode) 12, an electrolyte membrane 13, a gasket 21, a gasket 22, a separator 23, and a separator 24. As the gasket 21, the sealing member of the first electrode 11 may be used. As the gasket 22, the seal member of the second electrode 12 may be used.

It is preferable that the membrane electrode assembly 200 that the first electrode (anode) 11, the second electrode (cathode) 12, and the electrolyte membrane 13 are bonded together. The anode feeder may be provided separately from the separator 23. The cathode feeder may be provided separately from the separator 24.

In the electrochemical cell 300 shown in FIG. 5, a power supply, not shown, is connected to separators 23 and 24, and reactions occur at the anodes 11 and the cathodes 12. Water, for example, is supplied to the anode 11, and at the anode 11, water is decomposed into protons, oxygen and electrons. The support and feeder of the electrode is a porous material, and this porous material acts as a passage plate. The produced and unreacted water is discharged, while the protons and electrons are used for cathodic reactions. In the cathode reaction, protons and electrons react to produce hydrogen. Either or both of the hydrogen and oxygen produced are used, for example, as fuel for fuel cells.

Fourth Example

Figure 6:
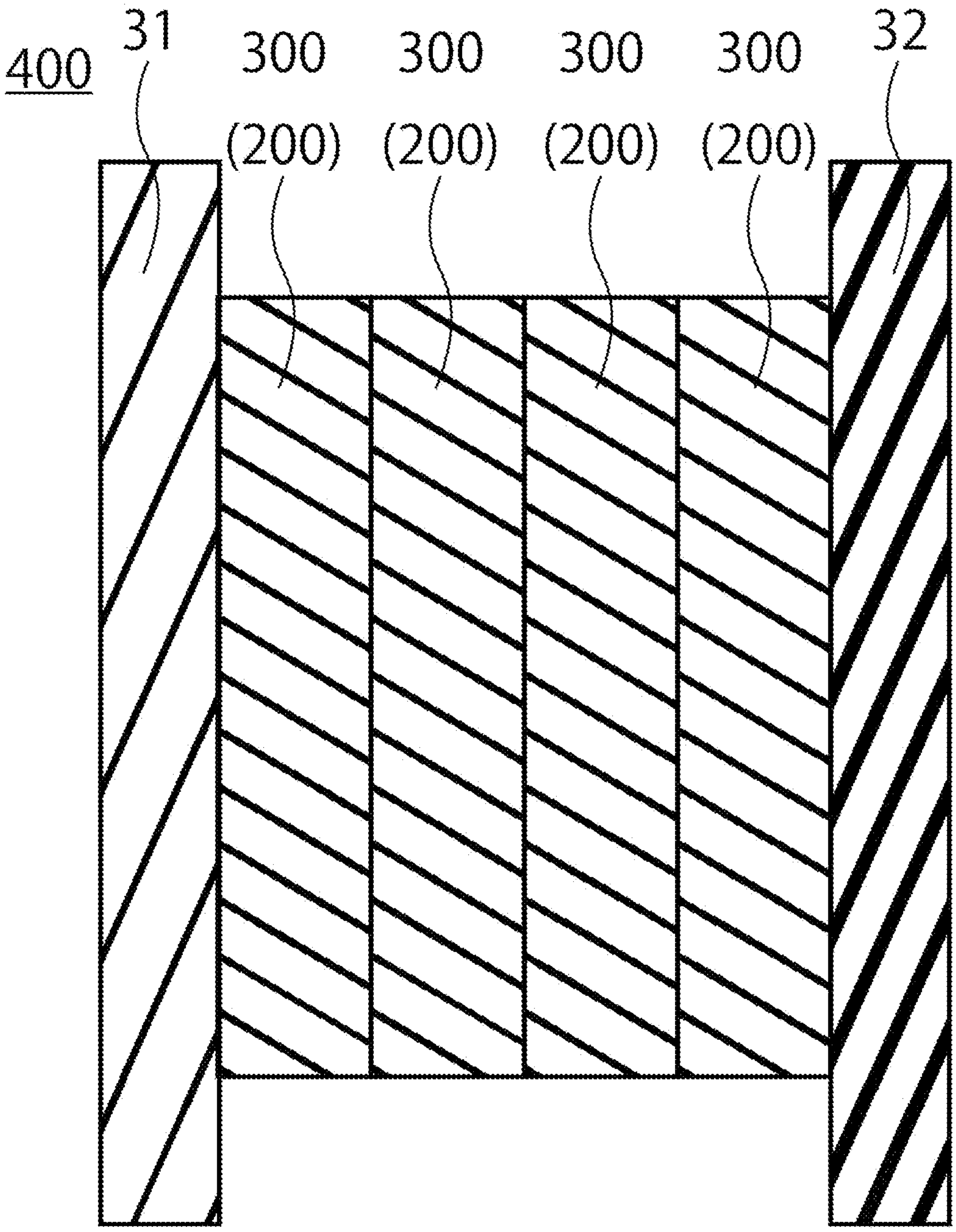
FIG. 6 is a schematic diagram of a stack according to an embodiment.

A fourth embodiment relates to a stack. FIG. 6 is a schematic cross-sectional diagram of a stack 400 of the fourth embodiment. The stack 400 of the fourth embodiment shown in FIG. 6 includes a plurality of MEA 200 or electrochemical cells 300 connected in series, with tightening plates 31 and 32 attached to both ends of the MEA or electrochemical cells.

Since the amount of hydrogen produced by the electrochemical cell 300 consisting of a single MEA 200 is small, the stack 400 consisting of multiple MEA 200 or multiple electrochemical cells 300 connected in series can produce a large amount of hydrogen.

Fifth Embodiment

Figure 7:
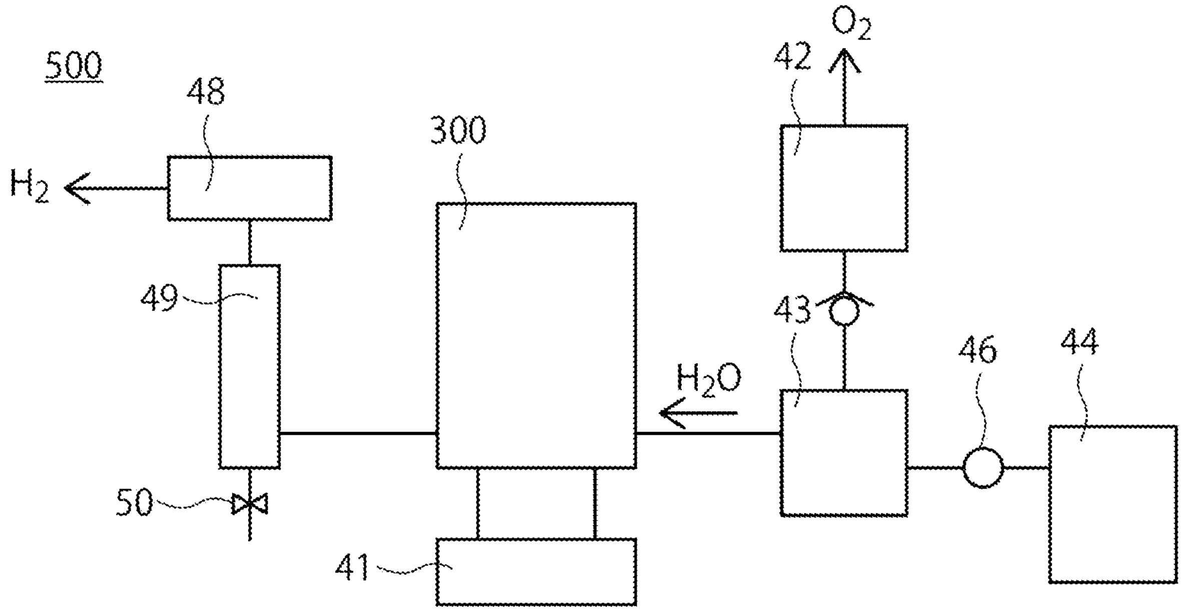
FIG. 7 is a conceptual diagram of an electrolyzer according to an embodiment.

A fifth embodiment relates to an electrolyzer. FIG. 7 shows a conceptual diagram of the electrolyzer of the fifth embodiment. Electrolyzer 500 uses electrochemical cell 300 or stack 400. The electrolyzer of FIG. 7 is for water electrolysis. The electrolyzer for water electrolysis will be described. For example, in the case of hydrogen generation from ammonia, it is preferable to employ a different configuration of electrodes 100. The electrodes of the embodiment can also be used in an electrolyzer that electrolyze carbon dioxide to produce organic substances such as methanol and ethylene, and carbon monoxide.

As shown in FIG. 7, single cells for water electrolysis are stacked in series to form a stack 400. The stack 400 is equipped with a power supply 41 and voltage is applied between the anode and cathode. On the anode side of the stack 400, a gas-liquid separator 42 that separates the generated gas and unreacted water, and a mixing tank 43 are connected. The water is circulated to the anodes. The oxygen produced at the anode passes through the gas-liquid separator 42 to obtain oxygen gas. On the cathode side, a hydrogen purifier 49 is connected to the gas-liquid separator 48 to obtain high-purity hydrogen. Impurities are discharged through a path with a valve 50 connected to the hydrogen purifier 49. The stack and mixing tank can be heated to control stable operating temperatures, and the current density during pyrolysis can be controlled.

Hereinafter, examples of the embodiments will be described.

Example A

Preparation of Anode (First Electrode 11)

A Ti non-woven fabric support with a size of 2 [cm]×2 [cm] and a thickness of 200 [μm] is used as the support. Nickel and iridium are sputtered onto the titanium support to form the sheet layer precursor. Then, only nickel is sputtered to form the gap layer precursor. This process of forming the sheet layer and gap layer is repeated 40 times to obtain a stacked structure with an Ir per area of 0.2 [mg/cm$^2$]. The sputtering conditions for the sheet layer and gap layer are shown in Tables 1 and 2. The laminated catalyst is obtained with nickel partially dissolved by subsequent washing with sulfuric acid. The ratio of nickel in the laminated catalyst after acid treatment [wt %] to the metal elements in the catalyst metal is shown in Table 3. In Example A, the amount of residual nickel is controlled by varying the time of acid treatment. After acid treatment, the sheet layer precursor mostly becomes a sheet layer. After acid treatment, the gap layer precursor mostly becomes a gap layer.

TABLE 1

| | Sheet Layer Precursor | | | | | | |
|---|---|---|---|---|---|---|---|
| | | Ir | | Ru | | Ni | |
| | Thickness [nm] | DC Output Power [W] | Time [sec] | DC Output Power [W] | Time [sec] | RF Output Power [W] | Time [sec] |
| Example A-1 | 20 | 50 | 360 | 0 | 0 | 370 | 360 |
| Example A-2 | 20 | 50 | 360 | 0 | 0 | 370 | 360 |
| Example A-3 | 20 | 50 | 360 | 0 | 0 | 370 | 360 |
| Example A-4 | 20 | 50 | 360 | 0 | 0 | 370 | 360 |
| Comparative Example A-1 | 20 | 50 | 360 | 0 | 0 | 370 | 360 |
| Comparative Example A-2 | 20 | 50 | 360 | 0 | 0 | 370 | 360 |
| Comparative Example A-3 | 20 | 50 | 360 | 0 | 0 | 370 | 360 |
| Comparative Example A-4 | 20 | 50 | 360 | 0 | 0 | 370 | 360 |

TABLE 2

| | Gap Layer Precursor | | | | | | | |
|---|---|---|---|---|---|---|---|---|
| | | Ir | | Ru | | Ni | | Time |
| | Thickness [nm] | DC Output Power [W] | Time [sec] | DC Output Power [W] | Time [sec] | RF Output Power [W] | Time [sec] | of Acid Treatment [hrs] |
| Example A-1 | 9 | 20 | 90 | 0 | 0 | 200 | 90 | 1 |
| Example A-2 | 8 | 20 | 90 | 0 | 0 | 200 | 90 | 2 |
| Example A-3 | 7 | 20 | 90 | 0 | 0 | 200 | 90 | 3 |
| Example A-4 | 6 | 20 | 90 | 0 | 0 | 200 | 90 | 4 |
| Comparative Example A-1 | 5 | 20 | 90 | 0 | 0 | 200 | 90 | 5 |
| Comparative Example A-2 | 5 | 20 | 90 | 0 | 0 | 200 | 90 | 8 |
| Comparative Example A-3 | 5 | 20 | 90 | 0 | 0 | 200 | 90 | 10 |
| Comparative Example A-4 | 12 | 20 | 90 | 0 | 0 | 200 | 90 | 0.5 |

TABLE 3

| | Amount of Ni [%] |
|---|---|
| Example A-1 | 8.0 |
| Example A-2 | 6.3 |
| Example A-3 | 5.0 |
| Example A-4 | 4.0 |
| Comparative Example A-1 | 3.8 |
| Comparative Example A-2 | 3.0 |
| Comparative Example A-3 | 2.5 |
| Comparative Example A-4 | 20.0 |

Preparation of Cathode (Second Electrode 12)

Prepare carbon paper Toray 060 (Toray Industries, Inc.) with an MPL layer of size 2 [cm]×2 [cm] and thickness 190 [μm] as the support. On this support, a porous catalyst layer containing a plurality of catalyst units with a stacked structure including a void layer is formed by sputtering method so that the loading density of Pt catalyst is 0.1 [mg/cm$^2$], and an electrode with a porous catalyst layer is obtained. This electrode is used as a standard cathode in the Examples and Comparative Examples.

The electrolyte membrane is 7 [cm]×7 [cm] in size, Nafion115 manufactured by Chemours, and the electrolyte membrane is sandwiched between the anode and the cathode for hot pressing. The MEA is placed in a hot press apparatus and pressed at 130[° C.] and 20 [kg/cm$^2$] for 3 minutes, followed by press cooling at 25[° C.] and 20 [kg/cm$^2$] for 3 minutes.

<Preparation of Single Cell>

The resulting MEA and gasket are set between two separators with passage plate to create a PEEC single cell (electrochemical cell). A back pressure valve is attached to the outlet of the hydrogen side of the separator with flow paths to increase the internal pressure of hydrogen.

Next, the anodes of Example A and Comparative Example A are evaluated. Conditioning is performed on the single cell obtained for one day. The temperature is then maintained at 80[° C.] and ultrapure water is supplied to the anode at 0.01 [L/min]. A current is applied between the anode and cathode at a current density of 2 [A/cm$^2$] using a power supply, and the cell voltage (VC) is measured after 48 hours of operation. The cell voltages (VC) are shown in Table 4.

Initial voltage is evaluated according to cell voltage (VC) as follows.

Cell voltage (VC) 1.7 [V] or more and less than 1.85 [V] Rating: A

Cell voltage (VC) 1.85 [V] or more and less than 1.9 [V] Rating: B

Cell voltage (VC) 1.9 [V] or more and 2.4 [V] or less Rating: C

Durability is evaluated according to the following durability protocol. A single cell is maintained at 80[° C.] while ultrapure water is supplied to the anode at a flow rate of 0.01 [L/min]. Under these conditions, the cell voltage is held at 1.2 [V] for 3 seconds, and then held at 2.0 [V] for 3 seconds, making one cycle. This cycle is repeated for a total of 3,000 cycles. The cell voltage (V1) is then measured after 24 hours of operation with a current applied at a current density of 2 [A/cm$^2$] between the anode and the cathode using the power supply. The voltage rise rate (100×(V1)/VC−100) is calculated by comparing the cell voltage (V1) with the cell voltage (VC) before durability evaluation. The voltage rise rate and cell voltage (V1) are shown in Table 2.

The durability is evaluated according to the voltage rise rate as follows.

Voltage rise rate 0[%] or more and 1.5[%] or less: A

Voltage rise rate 1.5[%] or more and 3[%] or less: B

Voltage rise rate more than 3[%] and less than 5[%]: C

Voltage rise rate more 5[%] and 50[%] or less: D

Initial voltage is evaluated as follows according to cell voltage (V1).

Cell voltage (V1) 1.7[V] or more and less than 1.85[V] Rating: A

Cell voltage (V1) 1.85 [V] or more and less than 1.9 [V] Rating: B

Cell voltage (V1) 1.9[V] or more and 2.4[V] or less Rating: C

TABLE 4

| | Cel Voltage [VC] | Voltage Rise Rate [%] | Cell Voltage [V1] |
|---|---|---|---|
| Example A-1 | 1.80 | 0.56 | 1.81 |
| Example A-2 | 1.81 | 0.55 | 1.82 |
| Example A-3 | 1.82 | 0.44 | 1.83 |
| Example A-4 | 1.85 | 0.27 | 1.86 |

TABLE 4-continued

| | Cel Voltage [VC] | Voltage Rise Rate [%] | Cell Voltage [V1] |
|---|---|---|---|
| Comparative Example A-1 | 1.90 | 0.26 | 1.91 |
| Comparative Example A-2 | 1.95 | 0.26 | 1.96 |
| Comparative Example A-3 | 2.10 | 0.24 | 2.11 |
| Comparative Example A-4 | 1.76 | 2.27 | 1.80 |

Figure 8:
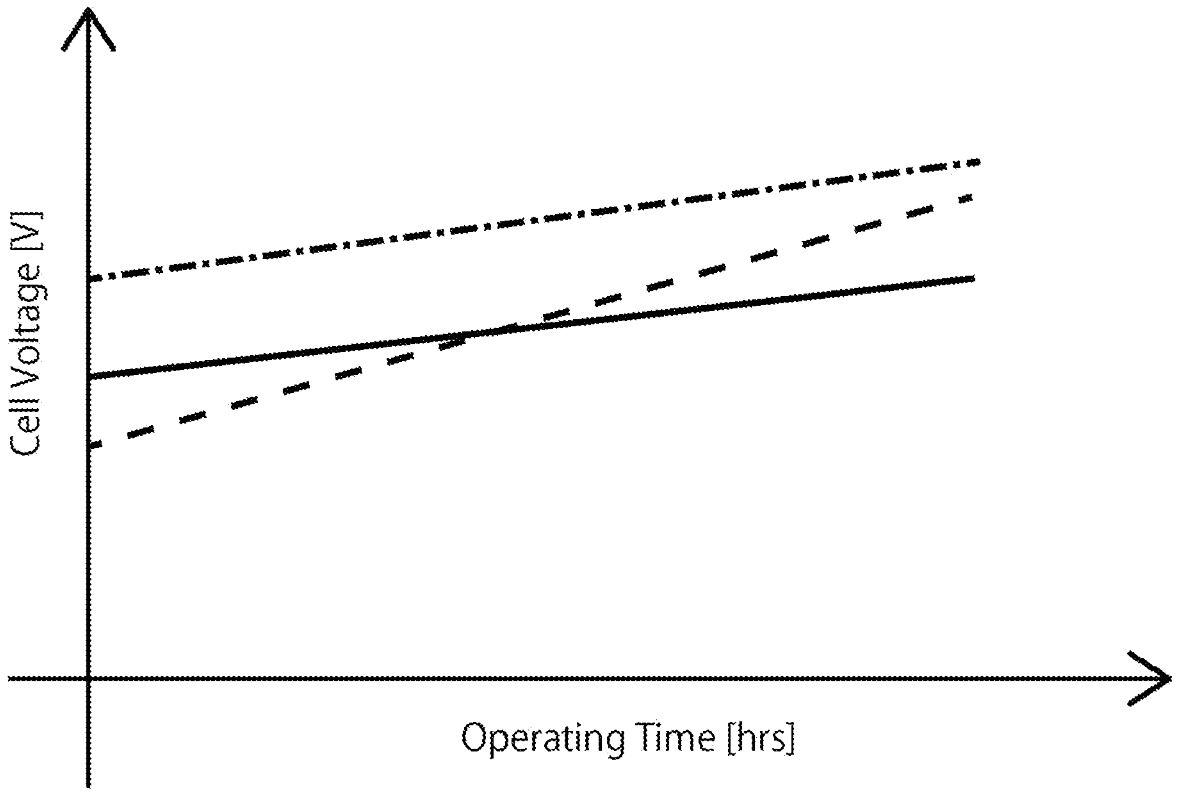
FIG. 8 is a graph of an example.

The graph in FIG. 8 shows the relationship between cell voltage (V) and operating time for a single cell with a 3% nickel anode electrode (Comparative Example A-2: single point long chain line), a single cell with a 6.3% nickel anode electrode (Example A-2: solid line), and a single cell with an anode electrode including 20% Ni (Comparative Example A-4: dashed line) are shown in the graph below, representing the relationship between cell voltage (V) and operating time.

Comparative Example A-2, with a low nickel content and a further collapsed gap layer, has a rather poor initial performance. On the other hand, the collapsed structure provides good durability, but the performance is inadequate because sufficient initial efficiency cannot be obtained with this structure. Comparative Example A-4, which has a large amount of nickel and wide gaps, has high initial performance, but the durability is not sufficient. This is considered to be because the structure has changed due to the dissolution of nickel during electrolysis. In Example A-2, a catalyst layer with relatively good initial performance and very high durability is obtained. The amount of nickel is 6.3%, and the gap layer is 8 [nm] wide, so the appropriate pore structure is maintained, and the initial performance and durability are considered to have been maintained.

Example B

Anodes are prepared under the conditions shown in Tables 5 and 6. Example B includes examples in which nickel is also sputtered during the formation of the sheet layer precursor. Example B also includes examples in which iridium and/or ruthenium are also sputtered during the formation of the gap layer precursor. Except for the anode preparation conditions, Example B is the same as Example A-1, where single cells are prepared in the same way as in Example A-1. Table 7 also shows the amount of nickel after acid treatment.

TABLE 5

| | Sheet Layer Precursor | | | | | | |
|---|---|---|---|---|---|---|---|
| | | Ir | | Ru | | Ni | |
| | Thickness [nm] | DC Output Power [W] | Time [sec] | DC Output Power [W] | Time [sec] | RF Output Power [W] | Time [sec] |
| Example B-1 | 20 | 25 | 360 | 25 | 360 | 370 | 360 |
| Example B-2 | 20 | 25 | 360 | 25 | 360 | 370 | 360 |
| Example B-3 | 20 | 25 | 360 | 25 | 360 | 370 | 360 |
| Example B-4 | 20 | 25 | 360 | 25 | 360 | 370 | 360 |
| Comparative Example B-1 | 20 | 25 | 360 | 25 | 360 | 370 | 360 |
| Comparative Example B-2 | 20 | 25 | 360 | 25 | 360 | 370 | 360 |
| Comparative Example B-3 | 20 | 25 | 360 | 25 | 360 | 370 | 360 |

TABLE 5-continued

| | Sheet Layer Precursor | | | | | | |
|---|---|---|---|---|---|---|---|
| | | Ir | | Ru | | Ni | |
| | Thickness [nm] | DC Output Power [W] | Time [sec] | DC Output Power [W] | Time [sec] | RF Output Power [W] | Time [sec] |
| Comparative Example B-4 | 20 | 25 | 360 | 25 | 360 | 370 | 360 |

TABLE 6

| | Gap Layer Precursor | | | | | | | |
|---|---|---|---|---|---|---|---|---|
| | | Ir | | Ru | | Ni | | Time |
| | Thickness [nm] | DC Output Power [W] | Time [sec] | DC Output Power [W] | Time [sec] | RF Output Power [W] | Time [sec] | of Acid Treatment [sec] |
| Example B-1 | 9 | 10 | 90 | 10 | 90 | 200 | 90 | 1 |
| Example B-2 | 8 | 10 | 90 | 10 | 90 | 200 | 90 | 2 |
| Example B-3 | 7 | 10 | 90 | 10 | 90 | 200 | 90 | 3 |
| Example B-4 | 6 | 10 | 90 | 10 | 90 | 200 | 90 | 4 |
| Comparative Example B-1 | 5 | 10 | 90 | 10 | 90 | 200 | 90 | 5 |
| Comparative Example B-2 | 5 | 10 | 90 | 10 | 90 | 200 | 90 | 8 |
| Comparative Example B-3 | 5 | 10 | 90 | 10 | 90 | 200 | 90 | 10 |
| Comparative Example B-4 | 12 | 10 | 90 | 10 | 90 | 200 | 90 | 0.5 |

TABLE 7

| | Amount of Ni [%] |
|---|---|
| Example B-1 | 8.0 |
| Example B-2 | 6.2 |
| Example B-3 | 5.1 |
| Example B-4 | 4.0 |
| Comparative Example B-1 | 3.8 |
| Comparative Example B-2 | 3.1 |
| Comparative Example B-3 | 2.5 |
| Comparative Example B-4 | 19.5 |

The prepared single cell is operated in the same manner as in Example A, and the cell voltage (VC) and cell voltage (V1) are obtained. The cell voltage (VC), the voltage rise rate, and cell voltage (V1) of Example B are shown in Table 8.

TABLE 8

| | Cel Voltage [VC] | Voltage Rise Rate [%] | Cell Voltage [V1] |
|---|---|---|---|
| Example B-1 | 1.73 | 1.16 | 1.75 |
| Example B-2 | 1.74 | 1.15 | 1.76 |
| Example B-3 | 1.75 | 1.14 | 1.77 |
| Example B-4 | 1.77 | 0.85 | 1.79 |
| Comparative Example B-1 | 1.86 | 0.81 | 1.87 |
| Comparative Example B-2 | 1.88 | 1.06 | 1.90 |
| Comparative Example B-3 | 2.03 | 0.74 | 2.05 |
| Comparative Example B-4 | 1.71 | 3.51 | 1.77 |

The overall initial voltage is improved by adding Ru. This is due to Ru's excellent catalytic performance as water electrolysis. On the other hand, the durability of Ru is worse than that of Ir alone, indicating that Ru does not have high long-term durability. Despite these trends, the initial performance and durability trends are similar to those of Example A. Comparative Example B-2, which has a small amount of nickel and a collapsed gap layer, has a much worse initial performance. On the other hand, the structure is collapsed, so the durability is good, but this does not provide sufficient initial efficiency, so the performance is insufficient. Comparative Example B-4, which has a large amount of nickel and wide gaps, has high initial performance, but the durability is not sufficient. This is considered to be because the structure has changed due to the dissolution of nickel during electrolysis. In Example B-2, a catalyst layer with relatively good initial performance and very high durability is obtained. The amount of nickel is 6.2%, and the gap layer is wider (8 nm), so the appropriate pore structure is maintained, and the initial performance and durability are considered to have been maintained.

Example C

Anodes are prepared under the conditions shown in Tables 9 and 10. In Example C, one or more selected from the group consisting of nickel, cobalt, and manganese are sputtered during the formation of the gap layer precursor. Except for the anode preparation conditions, Example C is performed in the same manner as in Example A-1, where single cells are prepared in the same manner as in Example A-1. Table 11 also shows the amount of non-noble metals after acid treatment.

TABLE 9

| | | Ir | | Ru | | Ni | | Co | | Mn | |
|---|---|---|---|---|---|---|---|---|---|---|---|
| | Thickness [nm] | DC Output Power [W] | Time [sec] | DC Output Power [w] | Time [sec] | RF Output Power [w] | Time [sec] | DC Output Power [W] | Time [sec] | RF Output Power [W] | Time [sec] |
| Example C-1 | 20 | 25 | 360 | 25 | 360 | 120 | 360 | 150 | 360 | 130 | 360 |
| Example C-2 | 20 | 25 | 360 | 25 | 360 | 120 | 360 | 150 | 360 | 130 | 360 |

TABLE 9-continued

| | Thickness [nm] | Ir DC Output Power [W] | Ir Time [sec] | Ru DC Output Power [w] | Ru Time [sec] | Ni RF Output Power [w] | Ni Time [sec] | Co DC Output Power [W] | Co Time [sec] | Mn RF Output Power [W] | Mn Time [sec] |
|---|---|---|---|---|---|---|---|---|---|---|---|
| Example C-3 | 20 | 25 | 360 | 25 | 360 | 120 | 360 | 150 | 360 | 130 | 360 |
| Example C-4 | 20 | 25 | 360 | 25 | 360 | 120 | 360 | 150 | 360 | 130 | 360 |
| Comparative Example C-1 | 20 | 25 | 360 | 25 | 360 | 120 | 360 | 150 | 360 | 130 | 360 |
| Comparative Example C-2 | 20 | 25 | 360 | 25 | 360 | 120 | 360 | 150 | 360 | 130 | 360 |
| Comparative Example C-3 | 20 | 25 | 360 | 25 | 360 | 120 | 360 | 150 | 360 | 130 | 350 |
| Comparative Example C-4 | 20 | 25 | 360 | 25 | 360 | 120 | 360 | 150 | 360 | 130 | 360 |

TABLE 10

| | Gap Layer Precursor Thickness [nm] | Ir DC Output Power [W] | Ir Time [sec] | Ru DC Output Power [W] | Ru Time [sec] | Ni RF Output Power [W] | Ni Time [sec] | Time of Acid Treatment [hrs] |
|---|---|---|---|---|---|---|---|---|
| Example C-1 | 9 | 10 | 90 | 10 | 90 | 10 | 90 | 1 |
| Example C-2 | 8 | 10 | 90 | 10 | 90 | 10 | 90 | 2 |
| Example C-3 | 7 | 10 | 90 | 10 | 90 | 10 | 90 | 3 |
| Example C-4 | 6 | 10 | 90 | 10 | 90 | 10 | 90 | 4 |
| Comparative Example C-1 | 5 | 10 | 90 | 10 | 90 | 10 | 90 | 5 |
| Comparative Example C-2 | 5 | 10 | 90 | 10 | 90 | 10 | 90 | 8 |
| Comparative Example C-3 | 5 | 10 | 90 | 10 | 90 | 10 | 90 | 10 |
| Comparative Example C-4 | 12 | 10 | 90 | 10 | 90 | 10 | 90 | 0.5 |

TABLE 11

| | Amount of Ni [%] | Amount of Co [%] | Amount of Mn [%] |
|---|---|---|---|
| Example C-1 | 3.0 | 3.0 | 2.0 |
| Example C-2 | 2.0 | 2.5 | 1.7 |
| Example C-3 | 1.5 | 2.2 | 1.6 |
| Example C-4 | 1.0 | 1.9 | 1.2 |
| Comparative Example C-1 | 1.0 | 1.5 | 1.0 |
| Comparative Example C-2 | 0.7 | 1.2 | 0.9 |
| Comparative Example C-3 | 0.6 | 1.0 | 0.8 |
| Comparative Example C-4 | 6.0 | 8.0 | 7.0 |

The prepared single cell is operated in the same manner as in Example A, and the cell voltage (VC) and cell voltage (V1) are determined. The cell voltage (VC), the voltage rise rate, and cell voltage (V1) of Example C are shown in Table 12.

The perforation effect is equivalent to that of Ni when not only Ni but also Co and Mn are added as perforating agents at the same time. In other words, the trends of initial performance and durability are the same as in Examples C-1 and C-2. Comparative Example C-2, in which the amount of perforating material is small and the gap layer is collapsed, shows considerably poor initial performance. On the other hand, the durability is good because the structure is collapsed, but the performance is insufficient because sufficient initial efficiency cannot be obtained in this case. Comparative Example C-4, which has a large amount of perforated material and a wide gap, has high initial performance, but the durability is not sufficient. This is thought to be due to structural changes caused by the dissolution of the porous material during electrolysis. In Example C-2, a catalyst layer with relatively good initial performance and very high durability is obtained. The amount of porous material is 2.0% nickel, 2.5% Co, and 1.7% Mn, for a total of 6.2%, and the gap layer is 8 nm wide, which is thought to have maintained the appropriate pore structure, and thus the initial performance and durability are maintained.

TABLE 12

| | Cel Voltage [VC] | Voltage Rise Rate [%] | Cell Voltage [V1] |
|---|---|---|---|
| Example C-1 | 1.73 | 1.16 | 1.75 |
| Example C-2 | 1.74 | 1.15 | 1.76 |
| Example C-3 | 1.75 | 1.14 | 1.77 |
| Example C-4 | 1.78 | 1.12 | 1.80 |
| Comparative Example C-1 | 1.86 | 1.08 | 1.88 |
| Comparative Example C-2 | 1.88 | 1.06 | 1.90 |
| Comparative Example C-3 | 2.03 | 0.74 | 2.05 |
| Comparative Example C-4 | 1.69 | 5.33 | 1.78 |

Some elements are expressed only by element symbols thereof.

Hereinafter, clauses of embodiments are additionally noted.

Clause 1. An electrode comprising:

a support; and a catalyst layer including a sheet layer and a gap layer stacked, alternately on the support, wherein the catalyst layer includes noble oxide and non-noble oxide, 4 [wt %] or more and 8 [wt %] or less of metal elements included in the catalyst layer is non-noble metal, and an average thickness of the gap layer is 6 [nm] or more and 50 [nm] or less.

Clause 2. The electrode according to clause 1, wherein the non-noble metal oxide is an oxide including one or more metal elements selected from the group consisting of Ni, Co, and Mn.

Clause 3. The electrode according to clause 1 or 2, wherein the non-noble metal oxide is an oxide including one or more metal elements selected from the group consisting of Ni, Co, and Mn, and the total ratio of Ni, Co and Mn among the non-noble metal elements included in catalyst layer is 80 [wt %] or more and 100 [wt %] or less.

Clause 4. The electrode according to any one of clauses 1 to 3, wherein the noble oxide is an oxide including Ir and/or Ru.

Clause 5. The electrode according to any one of clauses 1 to 4, wherein

4 [wt %] or more and 7 [wt %] or less of the metal elements in the catalyst layer is non-noble metal.

Clause 6. The electrode according to any one of clauses 1 to 4, wherein

4 [wt %] or more and 6 [wt %] or less of the metal elements in the catalyst layer is non-noble metal.

Clause 7 A membrane electrolyte assembly comprising:

the electrode according to any one of clauses 1 to 6.

Clause 8. An electrochemical cell comprising:

the membrane electrolyte assembly according to clause 7.

Clause 9. A stack comprising:

the membrane electrolyte assembly according to clause 7.

Clause 10. A stack comprising:

the electrochemical cell according to clause 8.

Clause 11. An electrolyzer comprising:

the stack according to clause 9.

Clause 12. An electrolyzer comprising:

the stack according to clause 10.

While certain embodiments have been described, these embodiments have been presented by way of example only, and are not intended to limit the scope of the inventions. Indeed, the novel embodiments described herein, for example, PEMEC as a water electrolysis cell may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising:

a support; and a catalyst layer including a sheet layer and a gap layer stacked, alternately on the support, wherein the catalyst layer includes noble oxide and non-noble oxide, 4 [wt %] or more and 8 [wt %] or less of metal elements included in the catalyst layer is non-noble metal, and an average thickness of the gap layer is 6 [nm] or more and 50 [nm] or less.

2. The electrode according to claim 1, wherein the non-noble metal oxide is an oxide including one or more metal elements selected from the group consisting of Ni, Co, and Mn.

3. The electrode according to claim 1, wherein the non-noble metal oxide is an oxide including one or more metal elements selected from the group consisting of Ni, Co, and Mn, and the total ratio of Ni, Co and Mn among the non-noble metal elements included in catalyst layer is 80 [wt %] or more and 100 [wt %] or less.

4. The electrode according to claim 1, wherein the noble oxide is an oxide including Ir and/or Ru.

5. The electrode according to claim 1, wherein

4 [wt %] or more and 7 [wt %] or less of the metal elements in the catalyst layer is non-noble metal.

6. The electrode according to claim 1, wherein

4 [wt %] or more and 6 [wt %] or less of the metal elements in the catalyst layer is non-noble metal.

7. A membrane electrolyte assembly comprising:

the electrode according to claim 6.

8. An electrochemical cell comprising:

the membrane electrolyte assembly according to claim 7.

9. A stack comprising:

the membrane electrolyte assembly according to claim 7.

10. A stack comprising:

the electrochemical cell according to claim 8.

11. An electrolyzer comprising:

the stack according to claim 9.

12. An electrolyzer comprising:

the stack according to claim 10.

* * * * *